US009375799B2

(12) United States Patent
Okamoto et al.

(10) Patent No.: US 9,375,799 B2
(45) Date of Patent: Jun. 28, 2016

(54) MULTI-WIRE ELECTRICAL DISCHARGE MACHINING SYSTEM, MULTI-WIRE ELECTRICAL DISCHARGE MACHINING APPARATUS, POWER SUPPLY DEVICE, MULTI-WIRE ELECTRICAL DISCHARGE MACHINING METHOD, SEMICONDUCTOR SUBSTRATE, SOLAR CELL SUBSTRATE, SUBSTRATE MANUFACTURING SYSTEM, AND SUBSTRATE MANUFACTURING METHOD

(71) Applicants: CANON MARKETING JAPAN KABUSHIKI KAISHA, Minato-ku, Tokyo (JP); KABUSHIKI KAISHA MAKINO HURAISU SEISAKUSHO, Aiko-gun, Kanagawa (JP)

(72) Inventors: Yasuhiro Okamoto, Kurashiki (JP); Akira Okada, Okayama (JP); Haruya Kurihara, Sagamihara (JP)

(73) Assignees: CANON MARKETING JAPAN KABUSHIKI KAISHA, Tokyo (JP); KABUSHIKI KAISHA MAKINO HURAISU SEISAKUSHO, Kanagawa (JP)

( * ) Notice: Subject to any disclaimer, the term of this patent is extended or adjusted under 35 U.S.C. 154(b) by 405 days.

(21) Appl. No.: 13/777,872

(22) Filed: Feb. 26, 2013

(65) Prior Publication Data
US 2013/0228553 A1 Sep. 5, 2013

(30) Foreign Application Priority Data

Mar. 1, 2012 (JP) .................................. 2012-44950
Nov. 6, 2012 (JP) ................................. 2012-244059

(51) Int. Cl.
B23H 1/02 (2006.01)
B23H 7/04 (2006.01)

(52) U.S. Cl.
CPC ................. *B23H 1/026* (2013.01); *B23H 1/028* (2013.01); *B23H 7/04* (2013.01)

(58) Field of Classification Search
CPC .......... B23H 1/026; B23H 1/028; B23H 7/04; B23H 7/065; B23H 7/07; B23H 7/10
See application file for complete search history.

(56) References Cited

U.S. PATENT DOCUMENTS 4,193,852 A * 3/1980 Inoue .......................... 219/69.12
4,243,864 A * 1/1981 Vieau et al. ................. 219/69.12

(Continued)

FOREIGN PATENT DOCUMENTS

CN 102066031 A 5/2011
JP 62-181826 A * 8/1987

(Continued)

*Primary Examiner* — Geoffrey S Evans
(74) *Attorney, Agent, or Firm* — Canon USA Inc. IP Division

(57) ABSTRACT

A multi-wire electrical discharge machining system for slicing a workpiece into a thin leaf at intervals of a plurality of wires arranged together causes the wires arranged together to travel in the same direction and includes a power feed contact configured to collectively comes into contact with the traveling wires, a machining power supply portion configured to supply a machining power supply to the power feed contact, and an electrical discharge portion configured to electrically discharge a machining power supply in which the traveling wires comes into contact with the power feed contact to collectively supply power to the traveling wires to the workpiece, in which a resistance between the machining power supply portion and the power feed contact is smaller than a resistance between the power feed contact and the electrical discharge portion.

14 Claims, 10 Drawing Sheets

ENLARGED VIEW OF POWER SUPPLY TERMINAL
(SIDE VIEW)

(56) References Cited

U.S. PATENT DOCUMENTS

| | | | |
|---|---|---|---|
| 4,438,312 A * | 3/1984 | Inoue | 219/69.12 |
| 2002/0162823 A1* | 11/2002 | Lin | 219/69.13 |
| 2009/0014420 A1* | 1/2009 | Sato | 219/69.12 |
| 2010/0187203 A1* | 7/2010 | Bamberg et al. | 219/69.12 |
| 2011/0092053 A1* | 4/2011 | Miyake et al. | 219/69.12 |
| 2012/0152906 A1* | 6/2012 | Sato | B23H 7/02 219/69.12 |
| 2012/0217224 A1* | 8/2012 | Miyake et al. | 219/69.12 |
| 2013/0140277 A1* | 6/2013 | Itokazu | B23H 1/028 219/69.15 |

FOREIGN PATENT DOCUMENTS

| | | | |
|---|---|---|---|
| JP | 63-120024 | * | 5/1988 |
| JP | 09-248719 | | 9/1997 |
| JP | 2007237348 A | | 9/2007 |
| JP | 2011140088 A | | 7/2011 |
| JP | 2011-251386 A | | 12/2011 |
| WO | WO-00/05024 A1 | * | 2/2000 |

* cited by examiner

ENLARGED VIEW IN LINE 16 IN Fig. 1
(FRONT VIEW)

ENLARGED VIEW OF POWER SUPPLY TERMINAL
(SIDE VIEW)

CONVENTIONAL
FIG.4
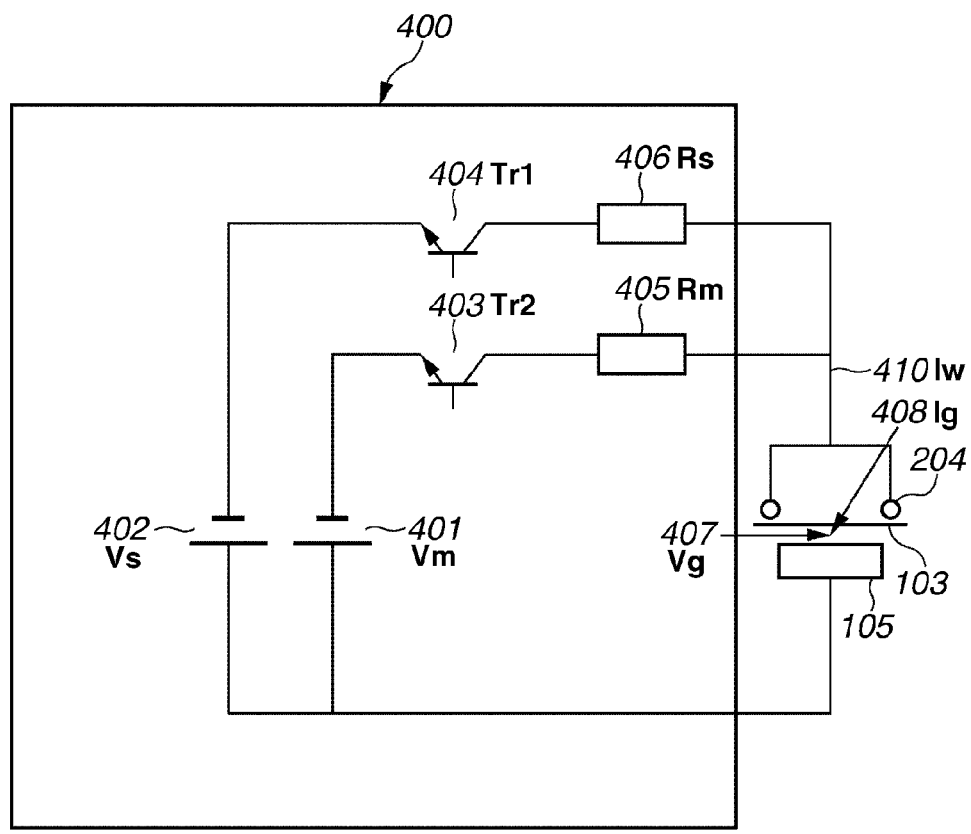

| NUMBER OF WIRES | Rmn (0.02Ω) | Rmn (0.2Ω) | Rmn (2Ω) |
|---|---|---|---|
| 1 | 3.0 | 2.9 | 2.5 |
| 2 | 6.0 | 5.8 | 4.3 |
| 3 | 8.9 | 8.5 | 5.6 |
| 4 | 11.9 | 11.1 | 6.7 |
| 5 | 14.9 | 13.6 | 7.5 |
| 6 | 17.8 | 16.1 | 8.2 |
| 7 | 20.7 | 18.4 | 8.8 |
| 8 | 23.6 | 20.7 | 9.2 |
| 9 | 26.5 | 22.9 | 9.6 |
| 10 | 29.4 | 25.0 | 10.0 |
| 50 | 136.4 | 75.0 | 13.6 |
| 100 | 250.0 | 100.0 | 14.3 |

| Vmn | NUMBER OF WIRES | MONITOR CURRENT VALUE (POINT A) |
|---|---|---|
| 100V | 1 | 0.3A |
| 100V | 3 | 0.7A |
| 100V | 5 | 0.9A |

| Vmn | NUMBER OF WIRES | MONITOR CURRENT VALUE (POINT A) |
|---|---|---|
| 160V | 1 | 1.4A |
| 160V | 3 | 2.9A |
| 160V | 5 | 3.7A | ved
MULTI-WIRE ELECTRICAL DISCHARGE MACHINING SYSTEM, MULTI-WIRE ELECTRICAL DISCHARGE MACHINING APPARATUS, POWER SUPPLY DEVICE, MULTI-WIRE ELECTRICAL DISCHARGE MACHINING METHOD, SEMICONDUCTOR SUBSTRATE, SOLAR CELL SUBSTRATE, SUBSTRATE MANUFACTURING SYSTEM, AND SUBSTRATE MANUFACTURING METHOD

BACKGROUND OF THE INVENTION

1. Field of the Invention

The present disclosure relates to a multi-wire electrical discharge machining system, a multi-wire electrical discharge machining apparatus, a power supply device, a multi-wire electrical discharge machining method, a semiconductor substrate, a solar cell substrate, a substrate manufacturing system, and a substrate manufacturing method.

2. Description of the Related Art

Up to now, there has been known a wire saw acting as an apparatus for slicing silicon ingot into multiple thin leaves. There has been also a technique for machining a member to a thin sheet by wire electrical discharge machining.

Japanese Patent Application Laid-Open No. 9-248719 discusses a technique in which power is supplied to one place of three wound wires to perform the electrical discharge machining on a semiconductor ingot.

In Japanese Patent Application Laid-Open No. 9-248719, however, if electric discharge does not occur uniformly and at the same time between a plurality of wires and a workpiece, nothing is discussed about a method for resolving a problem that surplus machining current of portion where the electric discharge does not occur is supplied between specific wire and workpiece where the electric discharge occurs.

SUMMARY OF THE INVENTION

The present disclosure provides a mechanism in which if electric discharge does not occur uniformly and at the same time between a plurality of wires and the workpiece, surplus machining current of portion where the electric discharge does not occur can be prevented from being supplied between a specific wire and a workpiece where the electric discharge occurs.

According to an aspect disclosed herein, a multi-wire electrical discharge machining system for slicing a workpiece into a thin leaf at intervals of a plurality of wires arranged together includes a multi-wire electrical discharge machining apparatus having a traveling unit configured to cause the plurality of wires arranged together to travel in the same direction, a power feed contact configured to collectively come into contact with the plurality of the traveling wires, and an electrical discharge portion configured to electrically discharge to the workpiece a machining power supply in which the plurality of the traveling wires comes into contact with the power feed contact to collectively supply power to the plurality of the traveling wires, and a power supply device configured to supply the machining power supply to the power feed contact, in which a resistance between the power supply device and the power feed contact is smaller than a resistance between the power feed contact and the electrical discharge portion.

Further features and aspects will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an electric circuit diagram in a conventional technique.

DESCRIPTION OF THE EMBODIMENTS

Various exemplary embodiments, features, and aspects of the invention will be described in detail below with reference to the drawings.

Figure 1:
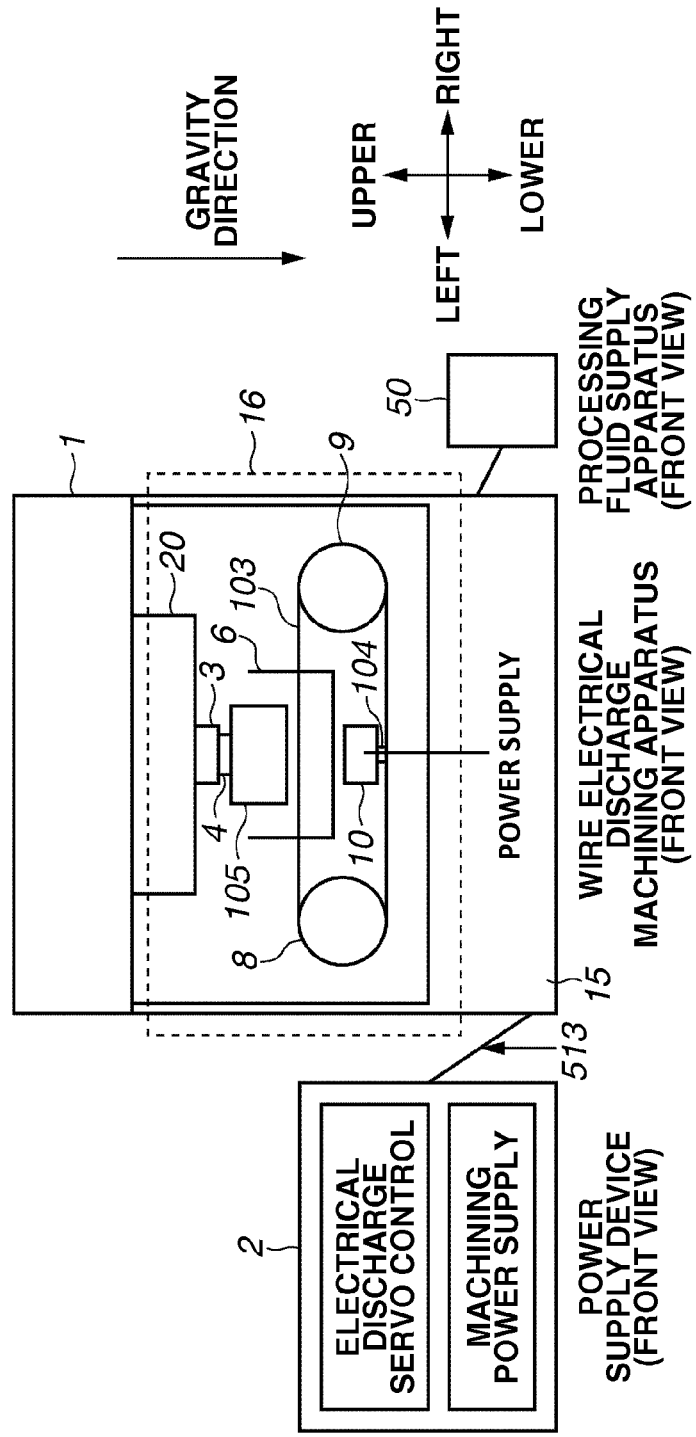
FIG. 1 illustrates a multi-wire electrical discharge machining system.

FIG. 1 is described below.

FIG. 1 is a front view of a multi-wire electrical discharge machine 1 according to an exemplary embodiment disclosed herein. The configuration of each mechanism illustrated in FIG. 1 is an example. It is to be understood that mechanisms may be variously configured according to purposes and applications.

FIG. 1 is a schematic diagram illustrating a configuration of a multi-wire electrical discharge machining system (a system for manufacturing a semiconductor substrate or a solar cell substrate). The multi-wire electrical discharge machining system includes a multi-wire electrical discharge machining apparatus 1, a power supply device 2, and a processing fluid supply apparatus 50.

The multi-wire electrical discharge machining can slice a workpiece into a thin leaf at intervals of a plurality of wires arranged together by electrical discharging.

The multi-wire electrical discharge machining apparatus 1 is provided with a workpiece feeding device 3 driven by a servo motor above a wire 103 to allow a workpiece 105 to move upward and downward. The workpiece 105 is transferred downward to be subjected to electrical discharge machining. Alternatively, the workpiece feeding device 3 is provided below the wire 103 to move the workpiece 105 upward.

In the power supply device 2, an electrical discharge servo control circuit for controlling a servo motor performs control to keep an electrical discharge gap constant for efficiently generating an electrical discharge according to the state of the electrical discharge, positions the workpiece, and progresses the electrical discharge machining.

A machining power supply circuit (in FIG. 7) supplies an electrical discharge pulse for electrical discharge machining to the wire 103, performs control adapting to a state such as a short-circuit occurring in the electrical discharge gap, and supplies an electrical discharge gap signal to the electrical discharge servo control circuit.

The processing fluid supply apparatus 50 sends processing fluid required for cooling an electrical discharge machining unit and removing a machining chip (waste) to the workpiece 105 and the wire 103 by a pump, removes a machining chip in the processing fluid, controls electric conductivity (1 μS to 250 μS) by ion exchange, and performs control of fluid temperature (around 20° C.). Water is mainly used, however, electrical discharge machining oil may be used.

Main rollers 8 and 9 are provided with grooves with predetermined pitches and in predetermined number so that machining can be performed at a desired thickness. A wire from a wire supply bobbin is tension controlled and wound around the two main rollers by required number to be sent to a winding bobbin. Wire speed is set to approximately 100 m/min to 900 m/min.

The two main rollers are rotated in conjunction with each other in the same direction and at the same speed to allow a single wire 103 supplied from a wire feeding portion to wind around the periphery of the two main rollers and to allow a plurality of wires 103 arranged together to travel in the same direction (traveling unit).

Figure 8:
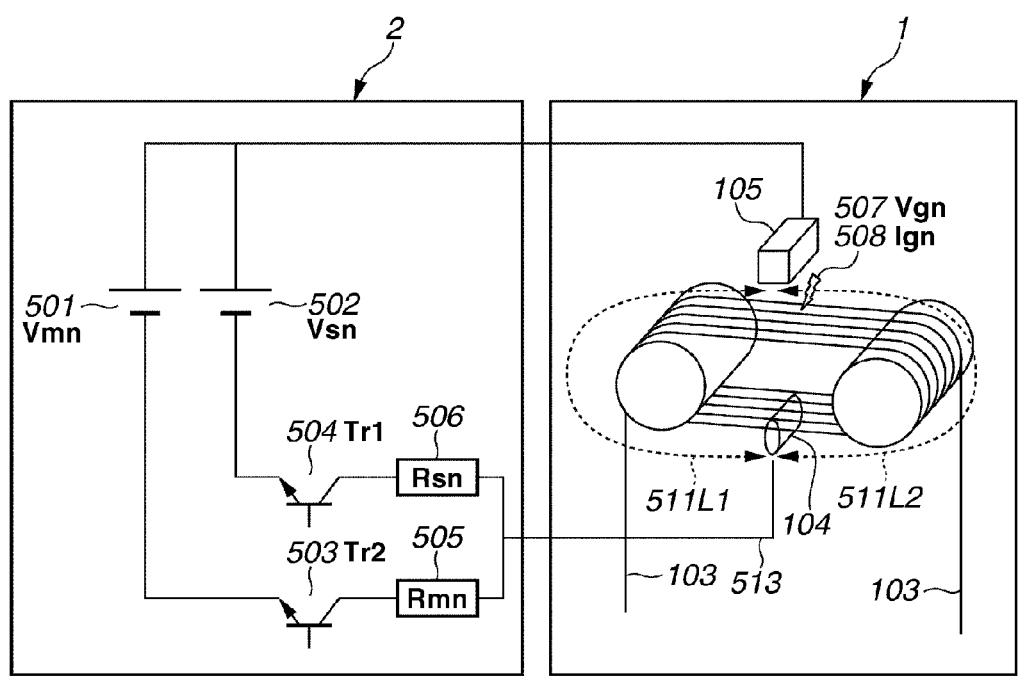
FIG. 8 illustrates a multi-wire electrical discharge machining system.

As illustrated in FIG. 8, the wire 103 that is a single continuous wire is fed from a bobbin (not illustrated), spirally wound around the outside of the main rollers by a multiple number of turns (2000 turns at maximum) while being fitted into a guide groove (not illustrated) on the peripheral surface of the main rollers, and then rolled up by a bobbin (not illustrated).

The multi-wire electrical discharge machining apparatus 1 is connected to the power supply unit 2 via an electric wire 513 and operated by power supplied from the power supply unit 2.

As illustrated in FIG. 1, the multi-wire electrical discharge machining apparatus 1 includes a block 15 functioning as a platform of the multi-wire electrical discharge machining apparatus 1, a block 20 provided above the block 15, the workpiece feeding device 3, a bonding portion 4, a silicon ingot 105, a processing fluid bath 6, the main roller 8, the wire 103, the main roller 9, a power supply unit 10, and a power feed contact 104.

Figure 2:
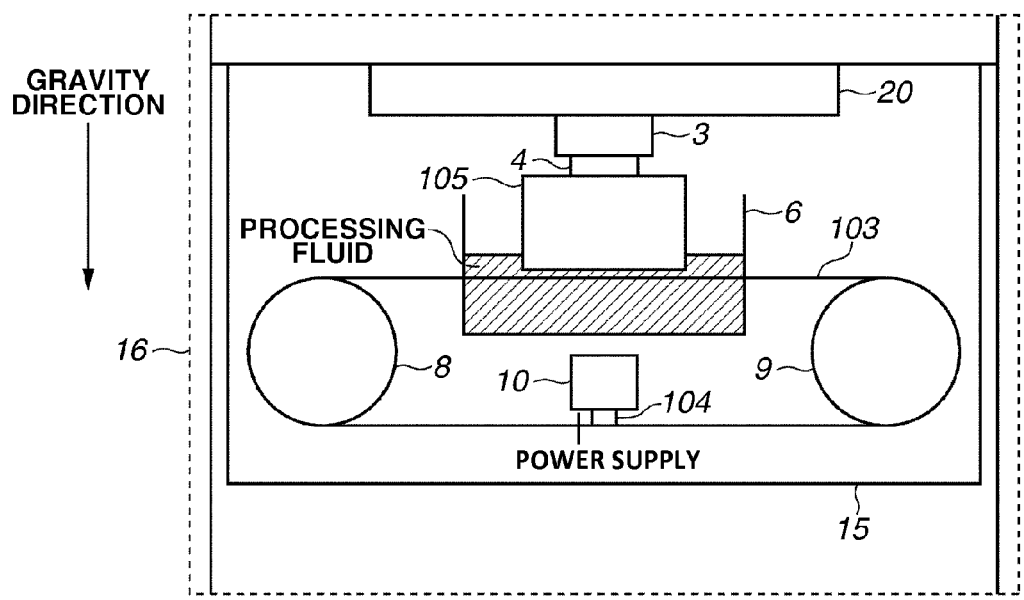
FIG. 2 illustrates a multi-wire electrical discharge machining apparatus.

FIG. 2 is described below.

FIG. 2 is an enlarged view in a frame of a dotted line 16 illustrated in FIG. 1.

The wire 103 is wound around the main rollers 8 and 9 by a plurality of turns and arranged side by side at a predetermined pitch according to grooves engraved in the main roller.

The main roller configured to be composed of metal in its center and the outside of the roller is covered with resin.

The power feed contact 104 for supplying an electrical discharge pulse from a machining power supply is provided below the center portion between the main guide rollers to be brought into contact with ten wires 103 (refer to FIG. 3).

The power feed contact 104 is arranged in a position where the wires become equal in length to each other from both ends of the silicon ingot 105.

A strong mechanical wear and high conductivity are required of the power feed contact 104. Hard metal is used for the power feed contact 104.

The silicon ingot 105 is arranged above the center portion between the main rollers, fixed to the workpiece feeding device 3, and performs machining while moving upward and downward.

The processing fluid bath 6 is provided at the center portion between the main rollers. The wire 103 and the silicon ingot 105 are immersed in the processing fluid bath 6 to cool the electrical discharge portion and remove machining chips.

Figure 3:
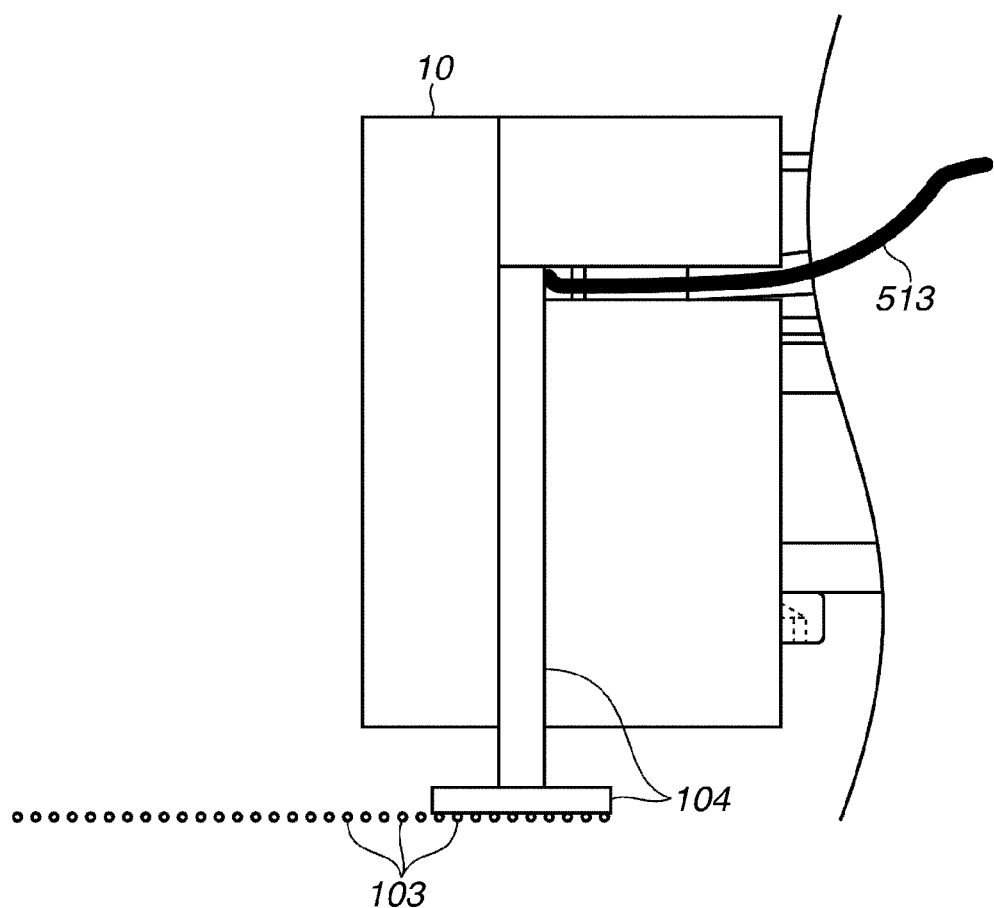
FIG. 3 illustrates a power feed contact.

As illustrated in FIG. 3, a single power feed contact 104 comes into contact with ten wires 104. Needless to say, the number of wires for each power feed contact 104 and the total number of the power feed contacts 104 may be increased if needed.

The block 20 is bonded to the workpiece feeding device 3. The workpiece feeding device 3 is attached (bonded) to the silicon ingot 105 by the bonding portion 4.

In the present exemplary embodiment, the silicon ingot 105 is cited as an example of a workpiece material (workpiece) in the following description.

No matter what material may be used for the bonding portion 4 provided that the bonding portion 4 is used to attach (bond) the workpiece feeding device 3 to the silicon ingot 105 (the workpiece). For example, a conductive adhesive is used.

The workpiece feeding device 3 is the one that is equipped with a mechanism for moving the silicon ingot 105 attached (bonded) by the bonding portion 4 upward and downward. The workpiece feeding device 3 is moved downward to allow the silicon ingot 105 to approach the wire 103.

The processing fluid bath 6 is a container for storing a processing fluid. The dielectric fluid is deionized water, for example, high in resistance. The processing fluid is provided between the wire 103 and the silicon ingot 105 to generate an electrical discharge between the wire 103 and the silicon ingot 105, allowing the silicon ingot 105 to be ground.

A plurality of grooves for fitting the wire 103 is formed in the main rollers 8 and 9 and the wire 103 is fitted to the grooves. The main rollers 8 and 9 are rotated clockwise or counter-clockwise to allow the wire 103 to travel.

As illustrated in FIG. 2, the wire 103 is fixed to the main rollers 8 and 9 to form an array of wires on the upper and lower sides of the main rollers 8 and 9.

The wire 103 is a conductor. The power feed contact 104 of the power supply unit 10 to which the power supply device 2 supplies voltage comes into contact with the wire 103 to cause the supplied voltage to be applied to the wire 103 via the power feed contact 104. (The power feed contact 104 applies voltage to the wire 103.)

An electrical discharge is generated between the wire 103 and the silicon ingot 105 to grind (performs electrical discharge machining) the silicon ingot 105, so that silicon in thin sheets (silicon wafer) can be produced.

FIG. 3 is described below.

FIG. 3 is an enlarged view of the power feed contact 104. The power feed contact 104 (one piece) contacts ten wires 103.

A distance between the wires 103 (wire pitch) is approximately 0.3 mm.

FIG. 4 is described below.

FIG. 4 illustrates an electric circuit 400 for a conventional system in which machining current is individually supplied to each wire.

A machining power supply (Vm) 401 is machining voltage set for supplying current required for the electrical discharge machining. The machining power supply (Vm) 401 is capable of setting an arbitrary machining voltage at 60 V to 150 V.

A machining power supply (Vs) 402 is used to set an induction voltage for inducing electrical discharge. The machining power supply (Vs) 402 is also used for monitoring an interelectrode voltage (interelectrode current) between the wire and the workpiece. The machining power supply (Vs) 402 is capable of setting the arbitrary induction voltage at 60 V to 300 V.

A transistor (Tr2) 403 turns the machining power supply (Vm) 401 ON (conduction) and OFF (non-conduction) by switching.

A transistor (Tr1) 404 turns the machining power supply (Vs) 402 ON (conduction) and OFF (non-conduction) by switching.

A machining current limiting resistor (Rm) 405 limits a wire current (Iw) for each wire and an interelectrode electrical discharge current (Ig) by setting a fixed resistance value. The machining current limiting resistor (Rm) 405 is capable of setting an arbitrary resistance value at 1Ω to 100Ω. More specifically, if Vm=60 V, Vg=30 V, and Rm=10Ω, Iw(Ig) is as follows. Iw(Ig)=(60 V−30 V)/10Ω=3 A.

In the above calculation equation, a voltage drop between the machining power supply (Vm) 401 and a power feed point (the power feed contact) is taken as 30 V and a voltage drop between the power supply point and the electrical discharge point due to a wire resistance (Rw) is not taken into consideration.

In the conventional individual power supply system, the value of the machining current (Iw) is determined by the resistance Rm of the machining current limiting resistor, so that the wire resistance Rw is set so that Rm>Rw to obtain desired wire current and electrical discharge current (Ig) for each wire.

An induction current limiting resistor (Rs) 406 limits induction current that induces electrical discharge by setting a fixed resistance value. The induction current limiting resistor Rs is capable of setting an arbitrary resistance value at 1Ω to 100Ω.

An interelectrode voltage (Vg) 407 is applied between the wire 103 and the workpiece 105 (interelectrode) during the electrical discharge.

An interelectrode current (Ig) 408 is a current flowing between the wire 103 and the workpiece 105 during electrical discharge.

A machining current (Iw) 410 is supplied individually to each wire.

Figure 5:
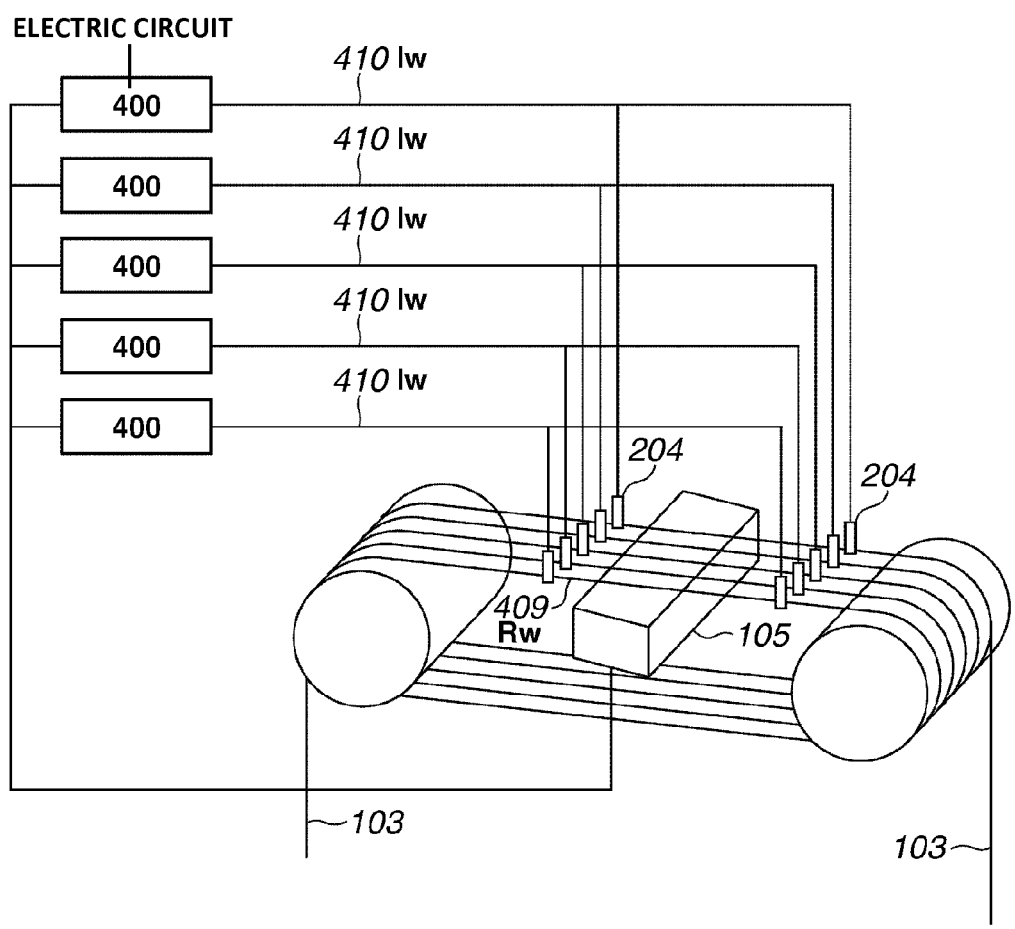
FIG. 5 illustrates a multi-wire electrical discharge machining apparatus in a conventional technique.

FIG. 5 is described below.

FIG. 5 is schematic diagram illustrating that the electric circuit 400 for the conventional system in which machining current is individually supplied to each wire supplies power to a plurality of wires.

A wire resistance (Rw) 409 indicates a resistance for each wire.

An individual power feed contact 204 provided at two places in the vicinity of both ends of the silicon ingot 105 supplies a machining-voltage pulse to perform the electrical discharge machining.

The individual power feed contacts 204 are connected to the electric circuits 400 equal in number to that of the wires 103 that are wound around.

Figure 6:
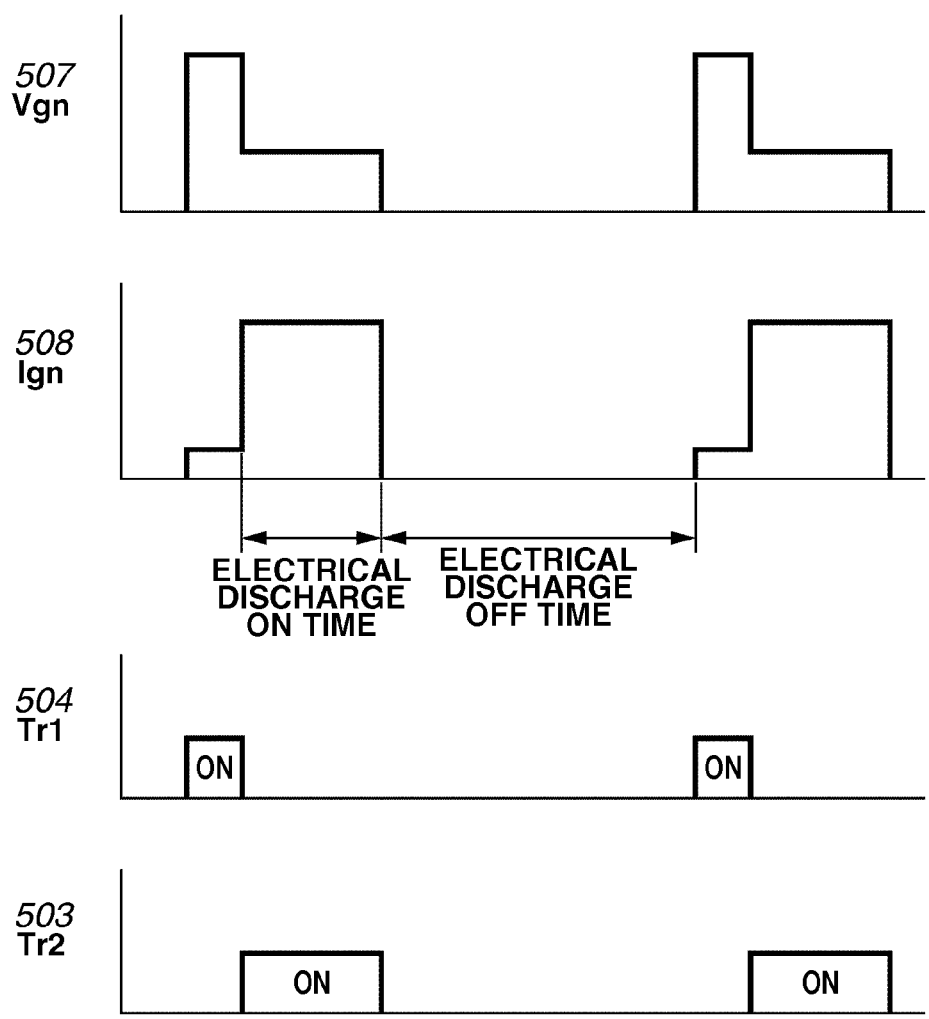
FIG. 6 illustrates electrical discharge pulse.

FIG. 6 illustrates a change in an interelectrode electrical discharge voltage (Vgn) and an interelectrode electrical discharge current (Ign) and an ON/OFF operation of the transistors Tr1 and Tr2 (timing chart). An horizontal axis of the graph indicates time.

A transistor Tr1 504 is turned on and an induction voltage is applied. At this point, a gap between the wire 103 and the workpiece 105 (interelectrode) is insulated, so that an interelectrode electrical discharge current hardly flows. Thereafter, when the interelectrode electrical discharge current starts flowing to start the electrical discharge, the interelectrode electrical discharge voltage Vgn lowers to allow the start of the electrical discharge to be detected, turning on the transistor Tr2 to obtain a large interelectrode electrical discharge current. The transistor Tr2 is turned off after a predetermined time elapses. After a predetermined time elapses since transistor Tr2 is turned off, a series of operations is repeated again.

Figure 7:
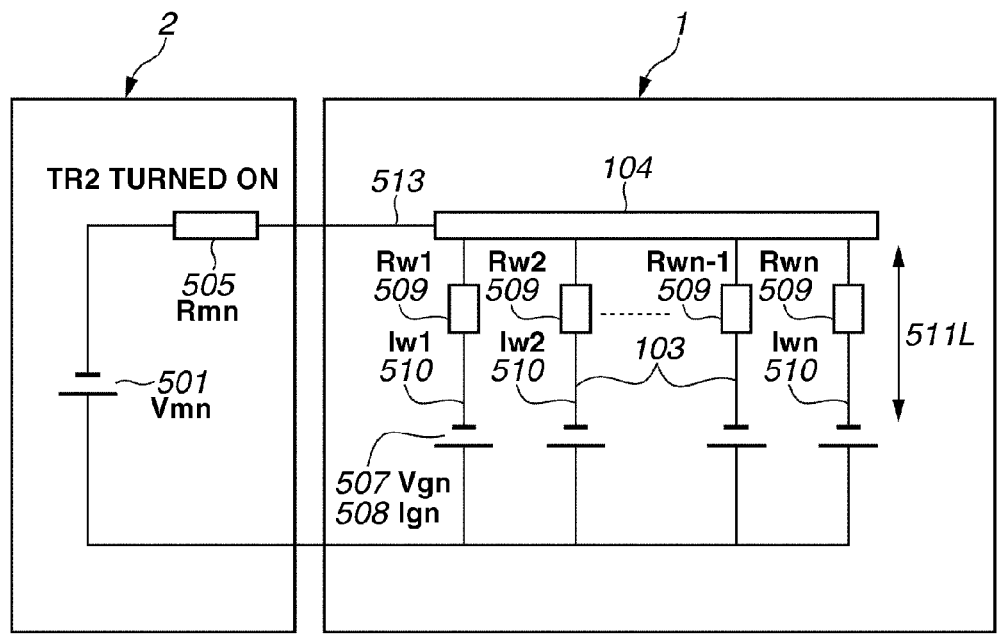
FIG. 7 illustrates an electric circuit diagram.

FIG. 7 is described below.

FIG. 7 is a circuit diagram of an electric circuit 2 in a collective power supply which collectively supplies machining current to a plurality of wires (ten wires). FIG. 7 indicates a state where the machining current, the wire current, and the interelectrode electrical discharge current flow.

FIG. 7 illustrates a equivalent circuit corresponding to the electric circuit 2 in FIG. 8.

If the conventional electric circuit 400 illustrated in FIG. 4 is directly introduced to an electric circuit which collectively supplies machining current to a plurality of wires (ten wires), instead of the machining current limiting resistor Rm 405, a current limiting resistor with a resistance value determined by dividing the machining current limiting resistor Rm by 10 (the number of turns of the wire wound around the main rollers 8 and 9) has only to be arranged between the machining power supply and the power feed point so that machining current of the sum (tenfold) of the wire current supplied to a plurality of wires (ten wires) is supplied to control the machining current between the machining power supply and the power feed point.

A case is described below in which the machining current limiting resistor Rm having thus fixed resistance value/ten wires is arranged between the machining power supply and the power feed contact.

If the electric discharge occurs uniformly and at the same time between all of the ten wires and the workpiece, the electrical discharge current is evenly distributed and supplied between each wire and the workpiece according to the fixed resistance value (Rm/ten wires), so that a problem of excessive electrical discharge current does not occur.

However, if the electric discharge does not occur uniformly and at the same time between all of the ten wires and the workpiece, wire current according to the fixed resistance value (Rm/ten wires) is intensively supplied between the wire and the workpiece which are in an electrical discharge state, which causes a problem in that excessive electrical discharge current is supplied. More specifically, if only one wire out of ten is in an electrical discharge state, a wire current being ten times the wire current to be supplied to one wire and the workpiece is supplied to the wire and the workpiece which are in an electrical discharge state, so that the wire is broken.

Unlike the conventional machining current limiting resistor in which a resistance value is fixed to a predetermined value, a resistance Rmn 505 of the wiring 513 has a control mechanism capable of varying a resistance value according to the number of wires which are in the electrical discharge state even if only one wire out of ten is in the electrical discharge state.

The resistance Rmn 505 is varied within a resistance value smaller enough than a wire resistance Rwn 509 to make the wire resistance Rwn 509 more dominant than the resistance Rmn 505 in limiting the machining current, so that the influence of the resistance Rmn 505 can be substantially neglected.

This means that there is no need to provide the machining current limiting resistor which limits the lower limit of the machining current that flows between a machining power supply unit 501 and the power feed contact 104 and that is an interelectrode electrical discharge current which electrical discharges on the workpiece at the interelectrode.

In other words, the resistance Rmn 505 has only to be made smaller than a resistance determined by simply dividing the Rmn by ten wires (the number of turns of the wire wound around the main rollers 8 and 9).

In other words, using impedance being the resistance Rwn 509 of each wire stably supplies a wire current Iwn of each wire, so that the convergence of the wire current does not occur.

The resistance Rwn 509 indicates a resistance of the wire for each wire.

A wire resistance between the power feed contact 104 and an electrical discharge portion is the one that varies according to the length of traveling wire (one wire) between the power feed contact 104 with which the wire comes into contact and the electrical discharge portion.

For example, each wire resistance is taken as Rw1, Rw2, . . . Rw10 in a case where power is collectively supplied to ten wires (the number of turns of the wire wound around the main rollers 8 and 9 is ten).

Unlike the conventional system, the resistance Rwn instead of the resistance Rmn is taken as a resistance for limiting the wire current (Iwn) and the electrical discharge current (Ign) for each wire, so that the wire current (Iwn) and the electrical discharge current (Ign) for each wire can be limited. In other words, a distance (length L) between the power feed point (the power feed contact) and the electrical discharge point (the electrical discharge portion) is varied, so that a wire resistance can be set to any resistance. Specifically, if Vmn=60 V, Vgn=30 V, and Rwn=10Ω, following is obtained.

$$Iwn(Ign)=(60\,V-30\,V)/10\,\Omega=3\,A.$$

In the above calculation equation, a voltage drop due to the wire resistance (Rwn) between the power feed point and the electrical discharge point is taken as 30 V, however, the above calculation equation does not consider a voltage drop due to the resistance (Rmn), which causes a voltage drop between the machining power supply and the power feed point, between the power feed point and the electrical discharge point.

In other words, the wire current Iwn is determined by the resistance Rmn in the collective power supply system, so that the resistance Rmn which causes a voltage drop between the machining power supply and the power feed point is set to have a relationship of Rmn<Rwn to obtain the desired wire current (Iwn) and the electrical discharge current (Ign) for each wire.

The resistance Rmn of each wire can be determined from three parameters: (1) an electric resistance ρ of a wire material; (2) a cross section B of the wire; and (3) a length L of the wire using an equation of Rwn=(ρ×B)/L.

A machining power supply portion (Vmn) 501 is a machining voltage set for supplying machining current required for the electrical discharge machining. The machining power supply portion Vmn can be set to any machining voltage. The machining power supply portion Vmn supplies a larger amount of machining current than that of the conventional system, so that the machining power supply portion Vmn supplies a larger power (the product of the machining voltage and the machining current) than the machining power supply 401.

The machining power supply portion 501 supplies the machining power supply Vmn to the power feed contact 104.

A machining power supply portion (Vsn) 502 is an induction voltage set for inducing electrical discharge. Furthermore, the machining power supply portion 502 is used for monitoring an interelectrode voltage between the wire and the workpiece and controlling the workpiece feeding device 3. The machining power supply unit Vsn may be set to any induction voltage. The machining power supply portion Vsn supplies a large amount of induction current compared with that of the conventional system, so that machining power supply portion Vsn supplies a larger power than the machining power supply 402.

The machining power supply portion 502 supplies the machining power supply Vsn to the power feed contact 104.

A transistor (Tr2) 503 switches ON (conduction) state and OFF (non-conduction) state of the machining power supply Vmn by switching.

A transistor (Tr1) 504 switches ON (conduction) state and OFF (non-conduction) state of the machining power supply Vsn by switching.

An electrical discharge interelectrode voltage (Vgn) 507 is the one that is applied between the wire 103 and the workpiece 105 during electrical discharge.

For example, when electrical discharge interelectrode voltages are collectively applied to ten wires, each electrical discharge interelectrode voltage is taken as Vg1, Vg2, . . . Vg10.

A portion where the electrical discharge interelectrode voltage is applied between the wire 103 and the workpiece 105 by the electrical discharge is an electrical discharge portion. In the electrical discharge portion, the machining power supply in which a plurality of traveling wires comes into contact with the power feed contact to collectively supply power to the plurality of traveling wires is electrically discharged to the workpiece.

An electrical discharge interelectrode current (Ign) 508 is the one that flows between the wire 103 and the workpiece 105 during electrical discharge.

For example, when electrical discharge interelectrode currents are collectively supplied to ten wires, each electrical discharge interelectrode current is taken as Ig1, Ig2, . . . Ig10.

A portion where the electrical discharge interelectrode current flows between the wire 103 and the workpiece 105 by the electrical discharge is an electrical discharge portion. In the electrical discharge portion, the machining power supply in which a plurality of traveling wires comes into contact with the power feed contact to collectively supply power to the plurality of traveling wires is electrically discharged to the workpiece.

A wire current (Iwn) 510 is individually supplied to each wire.

For example, when wire currents collectively supplied to ten wires, each wire current is taken as Iw1, Iw2, . . . Iw10.

A distance (L) 511 is a length of the wire between the power feed point (the power feed contact) and the electrical discharge point (the workpiece).

FIG. 8 is described below.

FIG. 8 is a schematic diagram illustrating that an electric circuit 2 for collectively supplying machining current to a plurality of wires (ten wires) collectively supplies power to the plurality of wires.

The power feed contact 104 collectively comes into contact with a plurality of traveling wires. An electrical discharge pulse is applied from one power feed contact 104 provided in a position opposing the silicon ingot 105 to perform the electrical discharge machining.

One electric circuit 2 is connected with respect to number of wires 103 (ten wires) wound around the main rollers.

The following describes machining current (the sum of wire currents) flowing to the wire with reference to the arrangement in FIG. 8.

As illustrated in FIG. 8, the wire current flowing from the power feed point (the position where the power feed contact 104 comes into contact with the wire 103) to the electrical discharge point (between the wire 103 and the workpiece 105) flows in two directions of right and left main rollers, so that a wire resistance to each direction exists.

A length (distance) between the power feed point and the electrical discharge point in a case where current flows in the direction of the left main roller is expressed by 511 L1. The wire resistance determined in a case of the length of L1 is taken as Rw1a.

A length (distance) between the electrical discharge point and the power feed point in a case where current flows in the direction of the right main roller is expressed by 511 L2. The wire resistance determined in a case of the length of L2 is taken as Rw1b.

A length of the wire 103 with one turn wound around the main rollers 8 and 9 is taken as two meters.

The power feed contact 104 is arranged in the position the distance of which is approximately equal to half of the length of the wire 103 with one turn wound around the main rollers 8 and 9, so that the distance between the electrical discharge point and the power feed point (wire length L) is one meter.

A distance of the wire traveling from the power feed contact 104 to electrical discharge portion is longer than 0.5 meters.

The wire 103 mainly contains iron and 0.12 mm in diameter (cross section=$0.06 \times 0.06 \times \pi$ mm$^2$). If the wire resistances Rw1a and Rw1b are taken as approximately 20Ω each because the wire is are equal in length (L1=L2=1 m), the resistance of one wire, with one turn wound around the main rollers 8 and 9, combining the wire resistances Rw1a and Rw1b is equal to approximately 10Ω.

As illustrated in FIG. 8, it is advantageous to arrange the power feed contact 104 in a position where the lengths L1 and L2 are equal to each other to make the wire resistances at the lengths L1 and L2 equal to each other, however, there are no problems anticipated if a difference in length between the lengths L1 and L2 is approximately 10% (for example, L1=1 m and L2=1.1 m).

If the electrical discharge voltages Vg1 to Vg10 are nearly equal to one another, the machining voltage Vmn is applied to the respective wire resistances Rw1 to Rw10, so that all the wire currents Iw1 to Iw10 are equal to one another.

The electrical discharge voltage Vmn is determined from a voltage drop (Rw1×Iw1) due to the wire resistance and electrical discharge voltage Cgn.

A voltage drop between the power feed contact 104 and the electrical discharge portion is attributable to the traveling wire resistance.

The wire resistance Rw1=10Ω (the resistance between the power feed contact 104 and the electrical discharge portion).

The wire current Iw1=3 A.

If the electrical discharge voltage Vgn is 30 V, the machining voltage Vmn is given by the following equation.

The machining voltage Vmn=10Ω×3 A+30 V=60 V.

Therefore, a voltage drop between the power feed contact 104 and the electrical discharge portion is greater than 10 V.

A resistance between the power feed contact 104 and the electrical discharge portion is greater than one Ω.

A voltage drop due to the wire resistance based on wire parameters may be set according to the equation of Rwn=($\rho \times$ B)/L.

A wire resistance Rmn is calculated in a case where the electric discharge occurs uniformly and at the same time between all ten wires and the workpiece. If all wires are in an electrical discharge state and a wire current Iw1 of 3 A flows to the ten wires, a machining current of 10 wires×3 A=30 A in total is required between the machining power supply and the power feed point. If a voltage drop between the machining power supply and the power feed point is 100/1 of the machining voltage Vmn (0.6 V), the wire resistance Rmn is given by the following equation.

A voltage drop between the machining power supply portion and the power feed contact 104 is smaller than 1 V.

Therefore, the voltage drop between the machining power supply portion and the power feed contact 104 is smaller than the voltage drop between the power feed contact 104 and the electrical discharge portion.

The wire resistance Rmn=0.6 V/30 A=0.02Ω (the resistance between the machining power supply unit 501 and the power feed contact 104).

Therefore, the resistance between the machining power supply unit 501 and the power feed contact 104 is smaller than 0.1Ω.

Therefore, the resistance between the machining power supply unit 501 and the power feed contact 104 is smaller than the resistance between the power feed contact 104 and the electrical discharge portion.

Therefore, the ratio of the voltage drop between the machining power supply portion and the power feed contact 104 to the voltage drop between the power feed contact 104 and the electrical discharge portion is equal to or more than 10 times.

Therefore, the ratio of the resistance between the machining power supply unit 501 and the power feed contact 104 to the resistance between the power feed contact 104 and the electrical discharge portion is equal to or more than 10 times.

A machining current of the ten wires in consideration of the wire resistance Rmn is obtained from (60 V−30 V)/((10Ω/10 wires)+0.02Ω)=29.41 A.

The machining current per wire is 2.941 A.

If the electric discharge does not occur uniformly and at the same time between all ten wires and the workpiece, and even if one-wire current flows, the machining current per wire is (60 V−30 V)/(10Ω+0.02Ω)=2.994 A, which is not significantly different from that in the case where the electric discharge occurs uniformly and at the same time between all ten wires and the workpiece.

A further effect can be obtained as follows. If power is supplied to N (a plurality of) wires (with N-turn wound around the main rollers 8 and 9) at one place (collectively), the machining speed becomes 1/N of a machining speed in individually supplying power to a single wire. Thus, even if power is supplied to N wires at one place (collectively), the machining speed equivalent to that in individually supplying power to a single wire can be maintained.

Figure 9:
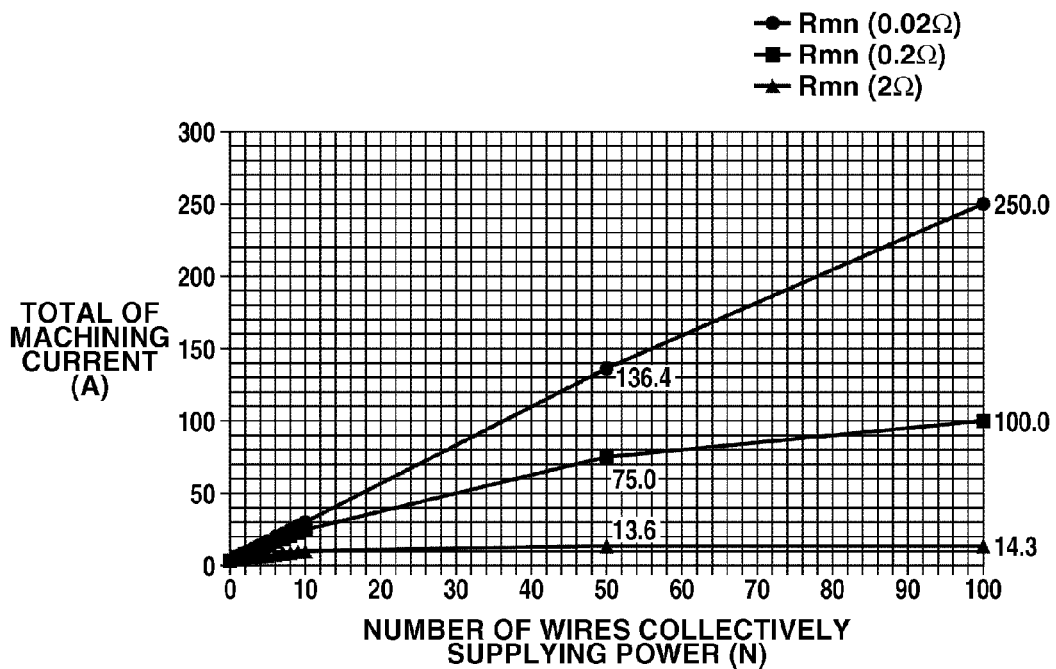
FIG. 9 illustrates results of a theoretical calculation of a correlation between machining current and the number of wires in the multi-wire electrical discharge machining system.

FIG. 9 is a graph of a theoretical calculation value of the total machining current varying as the number of wires increases with only the wire resistance Rmn made variable based on the above equation of (Vmn−Vgn)/((Rwn/the number of wires)+Rmn)=machining current.

In the equation, a machining current value (ampere) is obtained, where Vmn=60 V, Vgn=30 V, and Rwn=10Ω.

The vertical axis of the graph indicates total machining current (ampere) and the horizontal axis of the graph indicates the number of wires which comes into contact with the power feed contact to be supplied with power at one place (collectively). The power feed contact 104 different in size is brought into contact with the wire to supply power thereto to allow the number of wires to be supplied with power at one place (collectively) to be changed to one, two, ten, ..., or hundred.

Comparison is performed in the graph with the wire resistances Rmn (Ω) replaced by the three different resistance and with parameters except the Rmn fixed.

It can be seen from the graph that the smaller the Rmn, the more the total machining current directly related to the machining speed increases in approximate proportion to the number of wires as the number of wires increases.

Figure 10:
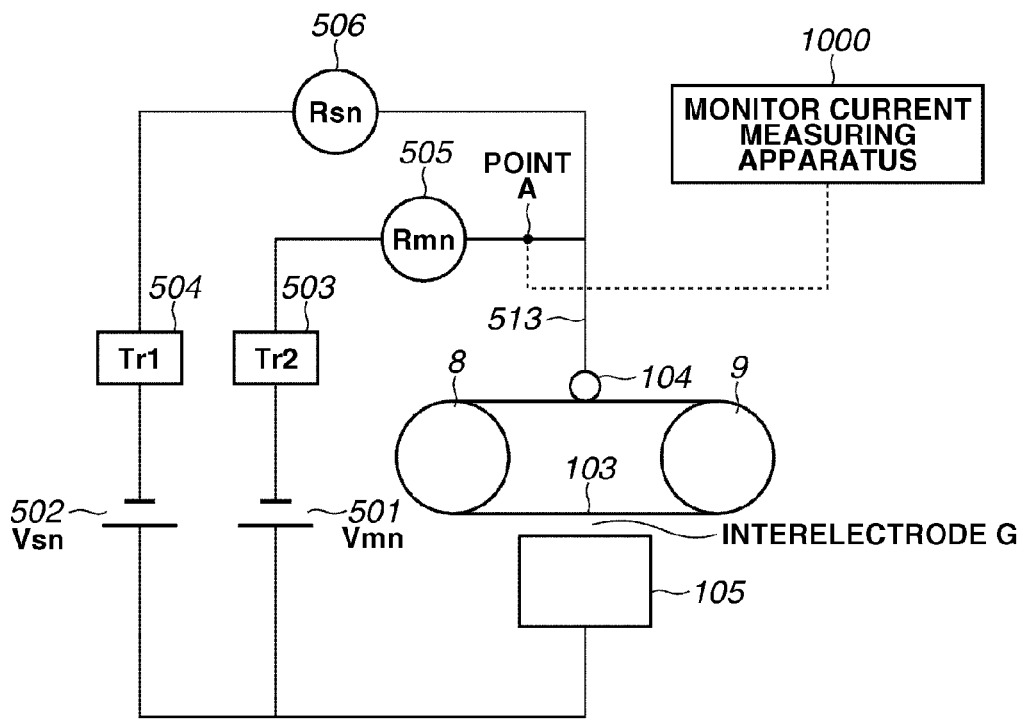
FIG. 10 illustrates results of a calculation of a correlation between monitor current and the number of wires in the multi-wire electrical discharge machining system.

FIG. 10 is a layout drawing in which a current measuring apparatus 1000 capable of measuring a monitor current flowing to a point A is arranged and a table of measurement results of monitor current values actually measured by current measuring apparatus 1000. If the monitor current value is regarded as total machining current value, the behavior of the machining current value can be confirmed from the actual measurement value of the monitor current.

Judging from the relationship between the measured monitor current value and the number of wires collectively supplied with power from the power feed contact 104, it is confirmed that the monitor current value increases as the number of wires collectively supplied with power increases. It can be seen from the table that the monitor current value increases to about three times if the number of wires collectively supplied with power increases to five times.

The results have proved that, if the wire resistance Rmn is decreased to 0.02Ω, the total machining current directly related to the machining speed increases in approximate proportion to the number of wires as the number of wires increases, as illustrated in FIG. 9. More specifically, increase in the total machining current increases also the wire current (Iwn) flowing to each wire in approximate proportion to the number of wires, so that, even if power is supplied to N wires at one place (collectively), the machining speed equivalent to that of individually supplying power to a single wire can be maintained.

It is desirable to set the resistance of an Rsn 506 high contrary to an Rmn 505.

A Vsn 502 acts not only as an induction voltage for inducing the above electrical discharge, but also as a detector for detecting whether a short-circuit occurs between the wire and the workpiece which are in an interelectrode state, so that it is advantageous that energy supplied from the Vsn 502 is as small as possible. In other words, the induction voltage and current supplied from the Vsn 502 do not directly contribute to the machining speed unlike the Vmn 501.

The resistance of the processing fluid between the wire 103 and the workpiece 105 (interelectrode) varies with the distance of the interelectrode. Consequently, the Rsn 506 of an induction current limiting resistance is made substantially equal to the resistance of the processing fluid between the interelectrode to allow variation in the interelectrode voltage (Vgn) to be detected.

The semiconductor ingot sliced by the multi-wire electrical discharge machining system is manufactured for a semiconductor substrate and a solar cell substrate and can be used as a semiconductor device and a solar cell.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2012-44950 filed Mar. 1, 2012 and No. 2012-244059 filed Nov. 6, 2012, which are hereby incorporated by reference herein in their entirety.

What is claimed is:

1. A multi-wire electrical discharge machining system for slicing a workpiece into a thin leaf at intervals of a plurality of wires arranged together, the multi-wire electrical discharge machining system comprising:

a multi-wire electrical discharge machining apparatus including a plurality of main rollers configured to cause the plurality of wires arranged together to travel in the same direction and a power feed contact configured to collectively come into contact with the plurality of wires, wherein a machine power supply collectively supplying power to the plurality of wires having been collectively in contact with the power feed contact discharges at an inter-electrode between the workpiece and the plurality of wires; and a power supply device configured to supply the machining power supply to the power feed contact, wherein a resistance between the power supply device and the power feed contact is less than a resistance between the power feed contact and the electrical discharge portion.

2. The multi-wire electrical discharge machining system according to claim 1, wherein the resistance between the power supply device and the power feed contact is less than 0.1Ω.

3. The multi-wire electrical discharge machining system according to claim 1, wherein the resistance of the wire arranged between the power feed contact and the inter-electrode between the workpiece and the plurality of wires is greater than 1Ω.

4. The multi-wire electrical discharge machining system according to claim 1, wherein a ratio of the resistance between the power supply device and the power feed contact to the resistance of the wire arranged between the power feed contact and the inter-electrode between the workpiece and the plurality of wires is greater than or equal to 10.

5. The multi-wire electrical discharge machining system according to claim 1, wherein a distance of the wire traveling between the power feed contact and the inter-electrode between the workpiece and the plurality of wires is greater than 0.5 m.

6. A multi-wire electrical discharge machining system for slicing a workpiece into a thin leaf at intervals of a plurality of wires arranged together, the multi-wire electrical discharge machining system comprising:

a multi-wire electrical discharge machining apparatus including a plurality of main rollers configured to cause the plurality of wires arranged together to travel in the same direction and a power feed contact configured to collectively come into contact with the plurality of the wires, wherein a machining power supply collectively supplying power to the plurality of wires having been collectively in contact with the power feed contact discharge at an inter-electrode between the workpiece and; and a power supply device configured to supply the machining power supply to the power feed contact;

wherein a voltage drop between the power supply device and the power feed contact is less than a voltage drop of a wire arranged between the workpiece and the plurality of wires.

7. The multi-wire electrical discharge machining system according to claim 6, wherein the voltage drop between the power supply device and the power feed contact is less than 1 V.

8. The multi-wire electrical discharge machining system according to claim 6, wherein the voltage drop of the wire arranged between the power feed contact and the inter-electrode between the workpiece and the plurality of wires is greater than 10 V.

9. The multi-wire electrical discharge machining system according to claim 6, wherein a ratio of the voltage drop between the power supply device and the power feed contact to the voltage drop of the wire arranged between the inter-electrode between the workpiece and the plurality of wires is greater than or equal to 10.

10. A multi-wire electrical discharge machining apparatus for slicing a workpiece into a thin leaf at intervals of a plurality of wires arranged together, the multi-wire electrical discharge machining apparatus comprising:
- a plurality of main rollers configured to cause the plurality of wires arranged together to travel in the same direction;
- a power feed contact configured to collectively come into contact with the plurality of the wires traveled by the plurality of main rollers; and
- a power supply device configured to supply a machining power to the power feed contact;
- wherein the machining power supply collectively supplying to the plurality of wires having been collectively in contact with the power feed contact discharges at an inter-electrode between the workpiece and the plurality of wires; and
- wherein a resistance between the power supply device and the power feed contact is less than a resistance of a wire arranged between the power feed contact and the inter-electrode between the workpiece and the plurality of travelling wires.

11. A power supply device for supplying a machining power to a power feed contact of a multi-wire electrical discharge machining apparatus for slicing a workpiece into a thin leaf at intervals of a plurality of wires arranged together, the multi-wire electrical discharge machining apparatus including, a plurality of main rollers configured to cause the plurality of wires arranged together to travel in the same direction and a power feed contact configured to collectively come into contact with the plurality of
- wherein a resistance between the power supply device and the power feed contact is less than a resistance of a wire arranged between the power feed contact and the inter-electrode between the workpiece and the travelling wires.

12. A multi-wire electrical discharge machining method for slicing a workpiece by a multi-wire electrical discharge machining system for slicing a semiconductor ingot into a thin leaf at intervals of a plurality of wires arranged together, the multi-wire electrical discharge machining system comprising:
- a plurality of main rollers configured to cause the plurality of wires arranged together to travel in the same direction;
- a power feed contact configured to collectively come into contact with the plurality of wires traveled by the plurality of main rollers;
- a machining power supply unit configured to supply a machining power to the power feed contact;
- wherein the machining power supply unit collectively supplying power to the plurality of wires having been collectively in contact with the power feed contact discharges at an inter-electrode between the workpiece and the plurality of travelling wires, and
- wherein a resistance between the machining power supply unit and the power feed contact is less than a resistance of a wire arranged between the power feed contact and the inter-electrode between the workpiece and the plurality of wires.

13. A substrate manufacturing system comprising:
- a multi-wire electrical discharge machining apparatus for slicing a workpiece into a thin leaf at intervals of a plurality of wires arranged together including a plurality of rollers configured to cause the plurality of wires arranged together to travel in the same direction and a power feed contact configured to collectively come into contact with the plurality of wires; and
- a power supply device configured to supply a machining power to the power feed contact,
- wherein the power supply device collectively supplying power to the plurality of travelling wires having been collectively in contact with the power feed contact discharges at an inter-electrode between the workpiece and the plurality of wires, and
- wherein a resistance between the power supply device and the power feed contact is less than a resistance of a wire arranged between the power feed contact and the inter-electrode between the workpiece and the plurality of traveling wires.

14. A substrate manufacturing method using a manufacturing system, the manufacturing system comprising:
- a multi-wire electrical discharge machining apparatus for slicing a workpiece into a thin leaf at intervals of a plurality of wires arranged together including
  - a plurality of main rollers configured to cause the plurality of wires arranged together to travel in the same direction, and
  - a power feed contact configured to collectively come into contact with the plurality of wires traveled by the plurality of main rollers; and
- a power supply device configured to supply a machining power to the power feed contact,
- wherein the power supply device collectively supplying power to the plurality of wires having been collectively in contact with the power feed contact discharges at an inter-electrode between the workpiece and the plurality of wires,
- wherein a resistance between the power supply device and the power feed contact is less than a resistance of a wire arranged between the power feed contact and the inter-electrode between the workpiece and the plurality of wires.

* * * * *